(12) United States Patent
Reeves et al.

(10) Patent No.: US 11,887,014 B2
(45) Date of Patent: Jan. 30, 2024

(54) DYNAMIC QUESTION RECOMMENDATION

(71) Applicant: SAP SE, Walldorf (DE)

(72) Inventors: Jeremiah Reeves, Ripon, CA (US);
Nithya Rajagopalan, Bangalore (IN);
Abhishek Chaturvedi, Bangalore (IN);
Sunil Gornalle, Bangalore (IN);
Prasad Karani, Karnataka (IN);
Surendranath Gopinathan, Bangalore (IN); Gurudayal Khosla, Bangalore (IN)

(73) Assignee: SAP SE, Walldorf (DE)

( * ) Notice: Subject to any disclaimer, the term of this patent is extended or adjusted under 35 U.S.C. 154(b) by 1587 days.

(21) Appl. No.: 16/047,223

(22) Filed: Jul. 27, 2018

(65) Prior Publication Data

US 2020/0034720 A1    Jan. 30, 2020

(51) Int. Cl.

| | |
|---|---|
| *G06F 16/00* | (2019.01) |
| *G06N 5/04* | (2023.01) |
| *G06Q 30/0601* | (2023.01) |
| *G06N 3/006* | (2023.01) |
| *G06N 20/00* | (2019.01) |
| *G06F 16/27* | (2019.01) |
| *G06F 16/81* | (2019.01) |
| *G06F 16/838* | (2019.01) |
| *G06F 16/835* | (2019.01) |

(52) U.S. Cl.
CPC ............... *G06N 5/04* (2013.01); *G06F 16/27* (2019.01); *G06F 16/81* (2019.01); *G06F 16/838* (2019.01); *G06F 16/8373* (2019.01); *G06N 3/006* (2013.01); *G06N 20/00* (2019.01); *G06Q 30/0625* (2013.01)

(58) Field of Classification Search
None
See application file for complete search history.

(56) References Cited

U.S. PATENT DOCUMENTS

| | | | |
|---|---|---|---|
| 9,005,119 B2* | 4/2015 | Iliff | G16H 15/00 600/300 |
| 9,996,604 B2* | 6/2018 | McCloskey | G06F 16/951 |
| 10,015,124 B2* | 7/2018 | McGregor, Jr. | G06V 30/274 |
| 10,366,107 B2* | 7/2019 | McCloskey | G06F 16/3329 |
| 10,412,030 B2* | 9/2019 | McGregor, Jr. | H04L 51/02 |
| 10,419,820 B2* | 9/2019 | Foerster | H04N 21/4755 |
| 10,862,836 B2* | 12/2020 | McGregor, Jr. | G06V 30/274 |
| 11,030,171 B2* | 6/2021 | Shahane | G06F 16/2228 |

(Continued)

*Primary Examiner* — Farhan M Syed
(74) *Attorney, Agent, or Firm* — SCHWEGMAN LUNDBERG & WOESSNER, P.A.

(57) ABSTRACT

In an example embodiment, a request is received, via a graphical user interface, to add a new object to a directory of objects, the new object having a first category in a hierarchical taxonomy of categories and objects. Then one or more questions previously assigned to the first category and/or one or more existing objects within the first category are retrieved. Each of the retrieved one or more questions and information about the new object are then fed into a first machine learned model trained to output a probability that a question is applicable to an object. One or more questions are generated for the new object based on the probability for each of the retrieved one or more questions. At least one of the one or more generated questions is then assigned to the new object.

17 Claims, 8 Drawing Sheets

(56) References Cited

U.S. PATENT DOCUMENTS

| | | | | |
|---|---|---|---|---|
| 2010/0138271 A1* | 6/2010 | Henkin | | G06Q 30/0256 705/14.54 |
| 2010/0138451 A1* | 6/2010 | Henkin | | G06Q 30/02 707/803 |
| 2010/0138452 A1* | 6/2010 | Henkin | | G06Q 30/02 707/803 |
| 2016/0034757 A1* | 2/2016 | Chhichhia | | G06F 16/35 382/206 |
| 2016/0057499 A1* | 2/2016 | Foerster | | G06Q 50/01 705/319 |
| 2016/0147891 A1* | 5/2016 | Chhichhia | | G06F 16/986 707/734 |
| 2018/0083898 A1* | 3/2018 | Pham | | H04L 51/046 |
| 2018/0083901 A1* | 3/2018 | McGregor, Jr. | | H04L 51/02 |
| 2018/0157641 A1* | 6/2018 | Byron | | G06F 16/23 |
| 2018/0165723 A1* | 6/2018 | Wright | | G06F 40/30 |
| 2018/0295081 A1* | 10/2018 | McGregor, Jr. | | H04L 51/02 |
| 2018/0314959 A1* | 11/2018 | Apokatanidis | | G06N 5/04 |
| 2019/0042988 A1* | 2/2019 | Brown | | G06F 9/547 |
| 2019/0043618 A1* | 2/2019 | Vaughan | | G16H 20/70 |
| 2019/0065589 A1* | 2/2019 | Wen | | G06F 16/353 |
| 2019/0171438 A1* | 6/2019 | Franchitti | | G06F 16/9538 |
| 2019/0236157 A1* | 8/2019 | Agarwal | | G06F 16/9535 |
| 2019/0258721 A1* | 8/2019 | Guo | | H04L 67/535 |
| 2019/0258722 A1* | 8/2019 | Guo | | G06F 16/9024 |
| 2019/0258739 A1* | 8/2019 | Guo | | G06F 16/951 |
| 2019/0258963 A1* | 8/2019 | Guo | | G06F 16/3322 |
| 2019/0294693 A1* | 9/2019 | Kanayama | | G06F 16/3322 |
| 2019/0311415 A1* | 10/2019 | Sewak | | G06F 18/213 |
| 2019/0340172 A1* | 11/2019 | McElvain | | G06F 16/248 |
| 2019/0394153 A1* | 12/2019 | McGregor, Jr. | | G06V 30/274 |
| 2020/0037036 A1* | 1/2020 | Foerster | | H04N 21/4782 |
| 2020/0410001 A1* | 12/2020 | Sarkissian | | G06F 3/0482 |
| 2021/0019674 A1* | 1/2021 | Crabtree | | G06V 30/274 |
| 2022/0019624 A1* | 1/2022 | Gwozdz | | G06F 40/169 |

* cited by examiner

FIG. 6

EVENT  DOC9690241 - SP-ALT-4  PREV  NEXT

ON THIS PAGE YOU CREATE THE INFORMATION THAT PARTICIPANTS WILL READ AND RESPOND TO DURING EVE...

DISPLAY: EDIT OBJECT ▾  ADD

① RULES
② TEAM
③ SUPPLIERS
④ CONTENT
⑤ SUMMARY

ALL CONTENT

| | NAME | PRICE | QUANTITY | EXTEND PRICE |
|---|---|---|---|---|
| | MATERIAL GROUP ▾ PIZZA | | | |
| | PLANT ▾ R100 | | | |
| | OBJECT CATEGORY MATERIAL | | | |
| 604A | PIZZA SIZE ▾ LARGE | | 602 | |
| | PIZZA TYPE ▾ CHEESE 604B | | | |

606A ☐ 2 DESCRIPTION OF THE FOOD ▾           604C
606B ☐ 3 SELECT THE MOST SUITABLE OPTIONS (MULTI-SELECTION)? ▾
606C ☐ 4 PLEASE ADD CERTIFICATION FOR FOOD SAFETY PERMISSION FOR REGION ▾   ATTACH A FILE ▾
606D ☐ 5 WHAT IS PERCENTAGE OF SATURATED FAT IN PRODUCT ▾ * 604D
606E ☐ 6 ARE ALL PRODUCTION PLANTS CERTIFIED TO FDA FOOD STANDARD? ▾   604E
606F ☐ 7 GENETIC ENGINEERING POSSIBLE? ▾  604F
606G ☐ 8 GENERAL REQUIREMENTS ▾  604G
606H ☐ 9 VALUE-DETERMINING INGREDIENTS IN % ▾  604H

ADD ▾  EDIT ▾  DELETE ▾  EXCEL IMPORT ▾  FULL EVENT IMPORT ▾   (*)

608

600

DYNAMIC QUESTION RECOMMENDATION

TECHNICAL FIELD

This document generally relates to systems and methods for question generation from electronic written content. More specifically, this document relates to the automated dynamic generation of questions.

BACKGROUND

Retail procurement is a branch of supply management in which businesses (such a retailers) acquire objects from other businesses (such as distributors, wholesalers, or manufacturers). Procurement in the retail industry goes beyond a transaction-based activity, to a strategic initiative that can drive significant savings. It is becoming more prevalent for retailers to utilize software to aid in the procurement process. Indeed, as a retailer grows larger, it becomes more and more necessary to automate and simplify the retail procurement process, so software has grown more advanced in the past few years.

In the retail procurement process, before proceeding to consummate a transaction (also known as "awarding an event"), a buyer at a retailer often wishes to know answers for questions that are associated with categories of objects being considered. These questions may be tightly associated with the event's objects, its categories, the region for which it is being procured, and the department. For example, if there is a dye product that has an amount of ammonia that is more than a permissible amount for a particular region, the buyer may want to ask a question such as "Is this dye safe for humans?" As another example, if there are certain guidelines for food products in region R2 and only a certified array of food products can be sold in that region, the buyer may wish to ask, "Are all production plants certified to XYZ Food Standards?"

With a large category and object base, however, it may be difficult for buyers to associate appropriate questions with a category or object, thus making it more likely that they will miss useful or even required questions to be asked to the suppliers. Furthermore, whenever a new category or object is added to the master data, the buyer needs to add all the basic questions associated with other objects in the category. This can slow down the data creation process in software.

BRIEF DESCRIPTION OF DRAWINGS

The present disclosure is illustrated by way of example and not limitation in the figures of the accompanying drawings, in which like references indicate similar elements.

FIG. 6 is a screen diagram illustrating a graphical user interface, in accordance with an example embodiment.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a machine learned model is utilized when adding a new object to a directory of objects available for procurement via software. The machine learned model is trained using a machine learning algorithm to identify relevant questions pertaining to the object, based on a category hierarchy as well as based on one or more features of the object and other objects in the category hierarchy. This leads to an improvement in how quickly software can add new products, providing a technical advantage over software that lacks such a machine learned model.

Figure 1:
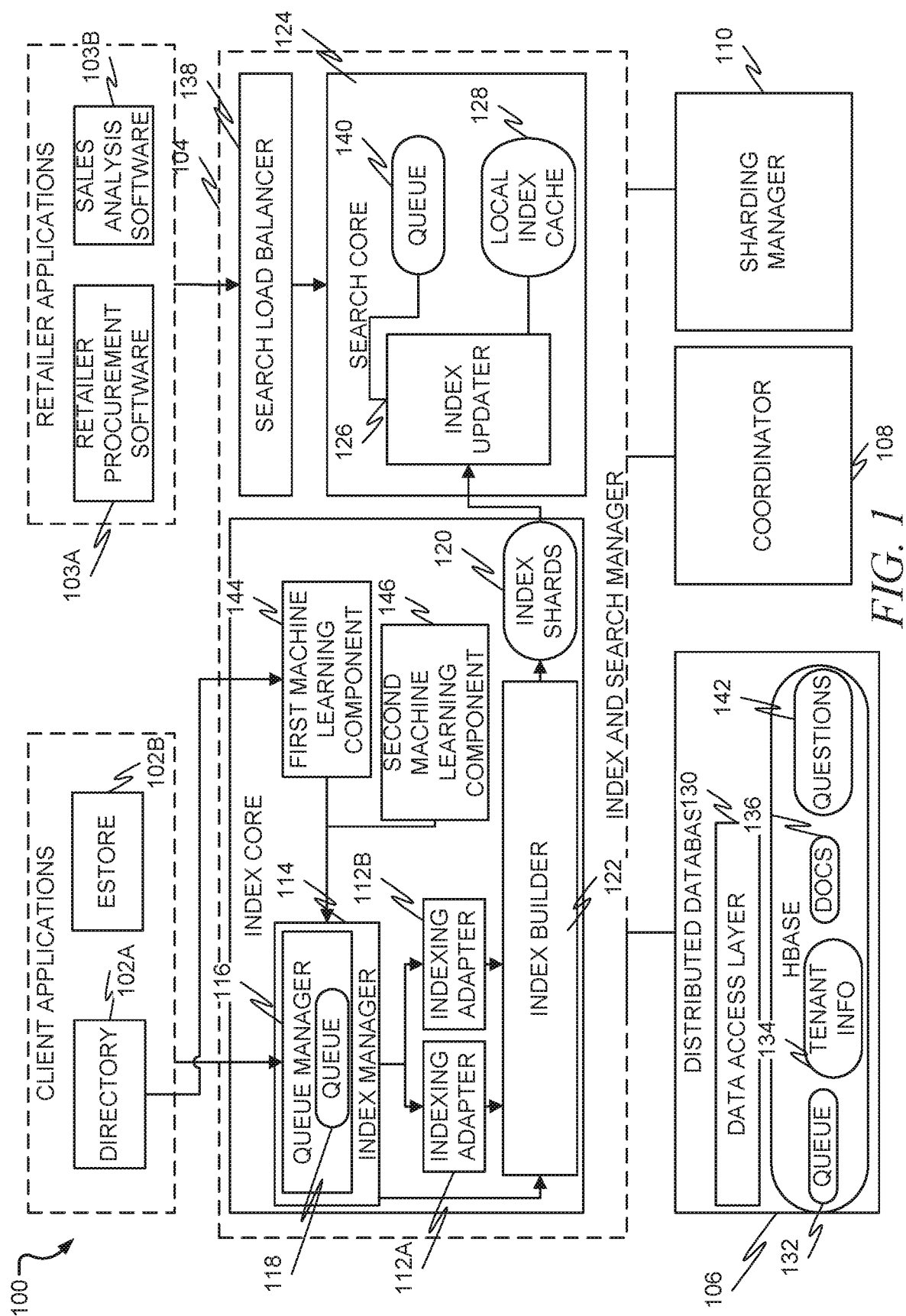
FIG. 1 is a block diagram illustrating a system, in accordance with an example embodiment, for retail procurement.

FIG. 1 is a block diagram illustrating a system 100, in accordance with an example embodiment, for retail procurement. The system 100 includes one or more client applications 102A, 102B, one or more retailer applications 103A, 103B, an index and search manager 104, a distributed database 106, a coordinator 108, and a sharding manager 110. Each client application 102A, 102B may represent a different application providing data to be indexed and eventually searched by the system 100. A single tenant (e.g., customer such as a manufacturer) may provide multiple clients, while other tenants may provide just a single client. In the depicted figure, the client application 102A is or includes a directory application, and the client application 102B is or includes an eStore application. Also in the depicted figure, the retailer application 103A is or includes software, whereas the retailer application 103B is or includes sales analysis software.

The client applications 102A, 102B may provide one or more of three different types of data streams (not pictured). Each data stream may have its own different data with distinct lifecycle and purpose. These data streams may be known as primary, auxiliary, and relevance and ranking (R/R). The primary data stream may include primary data, which is the data that is the main subject of indexing and searching. The auxiliary data stream may include data that is not directly indexed or searched but may enrich the primary data. The R/R data stream may include R/R data, which is data that plays a role in relevance and ranking of primary data objects during searching. As illustrative examples, if the client application 102A provides a directory, the primary data may include Directory Interchange Format (CIF) and Directory Extensible Markup Language (cXML) directorys, with the auxiliary data including supplier records, type definitions, contracts, and views, and the R/R data including a click stream and transaction data. If the client application 102B provides upstream information, the primary data may include contracts and projects, with the auxiliary data including entitlement information and the R/R data including a click stream.

Data streams can be transported as single documents, a multi-part collection, or a set of documents. For each client application 102A, 102B, an indexing adapter 112A, 112B may be provided. Each indexing adapter 112A, 112B can include a parser created to parse document types supported by the corresponding client application 102A, 102B. As an example, the client application 102A providing directory data may utilize the indexing adapter 112A, which may include a CIF parser (to parse primary CIF directory data) and various XM parsers for the auxiliary data, such as kit information, Units of Measure (UOM) maps, etc. Each parser may have two modes. The first mode can parse the byte stream of the incoming documents into rows. The second mode can parse the rows into an indexable object.

As pictured, the indexing adapters 112A, 112B may actually be contained in the index and search manager 104. An index manager 114 may act to manage the indexing process. This may include a queue manager 116 which manages a queue 118 containing incoming data from the client applications 102A, 102B which needs to be indexed. The index manager 114 may act to send data at the front of the queue 118 to the appropriate indexing adapter 112A, 112B for the corresponding client application 102A, 102B while also building a request to an index builder 122.

In an example embodiment, the index manager 114 may have a redundant architecture that provides an application programming interface (API) to the client applications 102A, 102B to allow the client applications 102A, 102B to submit indexing jobs. The indexing message produced through the API may contain enough information to uniquely identify the request. This identification could be used to track the status of the submitted jobs.

The index manager 114 may utilize feedback from the distributed database 106 to decide on the indexing jobs to be run in the distributed database 106 to allow a scalable computing architecture for building index shards 120. Specifically, the index manager 114 may send a request to build an index to the index builder 122, which may build the index shards 120. A search core 124 may contain an index updater 126, which can take the index shards 120 and update a local index cache 128 using the index shards 120. This local index cache 128 can then be synchronized with a network file system, which can then distribute the index to the distributed database 106. Each index shard 120 is a subset of the index for a given file type. For example, a shard could include directory objects from a subset of tenants. For large directorys, a single directory may span multiple index shards 120.

The distributed database may 106 may contain a data access layer 130, a queue 132, tenant information 134, documents 136, and questions 142. As will be described later, the questions 142 may be pregenerated questions that are dynamically assigned to objects based on the category and features of similar objects.

The search core 124 may host a Lucene index and answer search queries from the retailer applications 103A, 103B via a search load balancer 138, which acts to balance the load of search requests among multiple instantiations of the search core 124 on multiple physical or logical servers. The search core 124 may also expose a Representational State Transfer (REST)-based search and faceting API (not pictured). The search core 124 may perform aggregation, faceting, ranking, and relevance algorithms on search results. The source documents are primary indexing targets. Each source document may store a document identification key for auxiliary data. In an example embodiment, the auxiliary data itself is stored in the same index shard 120. This allows for locality of reference, so that an auxiliary data object related to a primary data object can be easily retrieved during a search.

The search core 124 may keep track of recent changes to the local index cache 128 in a special queue 140 for receiving the updates to support search. The updates may be immediately applied to the reader but may be batched before committing to the local index segments.

The index manager 114 may use information from the coordinator 108 and the sharding manager 110 to decide on the indexing jobs to be run in the distributed database 106 to allow a scalable computing architecture for building the index shards 120.

Each index shard 120 may contain Lucene index segments for a set of tenants, as will be described in more detail below. The job of indexing may be designed as a map-reduce job that parses the source document and any auxiliary documents to create the Lucene index segments.

Within the local index cache 128, the primary documents may be modeled as Lucene "documents." The document fields, their indexing properties (stored, indexed, etc.), norms, etc. may be modeled in the bundle providing the local index cache 128. The auxiliary document identifications may be stored in the Lucene document for linking the auxiliary data. The actual auxiliary documents may be stored in the same index as separate documents. For example, a single shard may contain documents relating to a first tenant, including a first directory object (with object attributes and supplier identification), a second directory object (with object attributes and supplier identification), a third directory object (with object attributes and supplier identification), and a supplier document with three different supplier detail files. The supplier document is a single document, with the supplier detail files being auxiliary documents. The supplier document may be stored with a key matching the supplier identification field in each source document in the index.

The coordinator 108 may implement a protocol for routing, shard configuration, rolling-apply, and other management functions. The coordinator 108 may additionally provide the node status and consensus protocol.

The sharding manager 110 may implement the elasticity architecture for distributing the index across search cores 124. In an example embodiment, the sharding manager 110 may receive a HyperText Transfer Protocol (HTTP) request for a search and may be aware of which search core 124 can respond to this request. It can then route the request to the specific search core 124, perhaps based at least partially on load balancing if multiple search cores 124 can respond to the request. The search core 124 may then use libraries to parse the queries and launch a search, and then respond with matches found, in an extensible markup language (XML) document. The XML document may comprise primary data along with the supporting auxiliary data.

Handling data pertaining to objects within a retail procurement environment is different, from the technical perspective, from handling data within other cloud or large storage environments due to the complexity and strictness of the categories in retail environments. Each retail object can be assigned to a category or categories within a multi-level hierarchical taxonomy. While certain features of an object can be inherited from parent categories, other features cannot. A machine learned model can help differentiate between the two. For example, certain questions may only be applicable when a certain set of preconditions are met by the object. For example, paints contain certain chemicals which may or may not be legal to sell in certain jurisdictions. California might ban paints having more than X amount of ingredient i1, whereas Texas may permit any amount of ingredient i1 to be used in paints sold in that state. A pregenerated question for paints may therefore be "How much of ingredient i1 does this paint contain?" Such a question, however, would only be relevant to paints that actually contain ingredient i1. Furthermore, such a question may not be relevant at all if the retailer intends to sell only in Texas. As such, even though the question may have been previously assigned to the category of paints, the addition of a new object (e.g., a new paint product) to the taxonomy under the category of paints may or may not result in the question being inherited by the new object.

Figure 2:
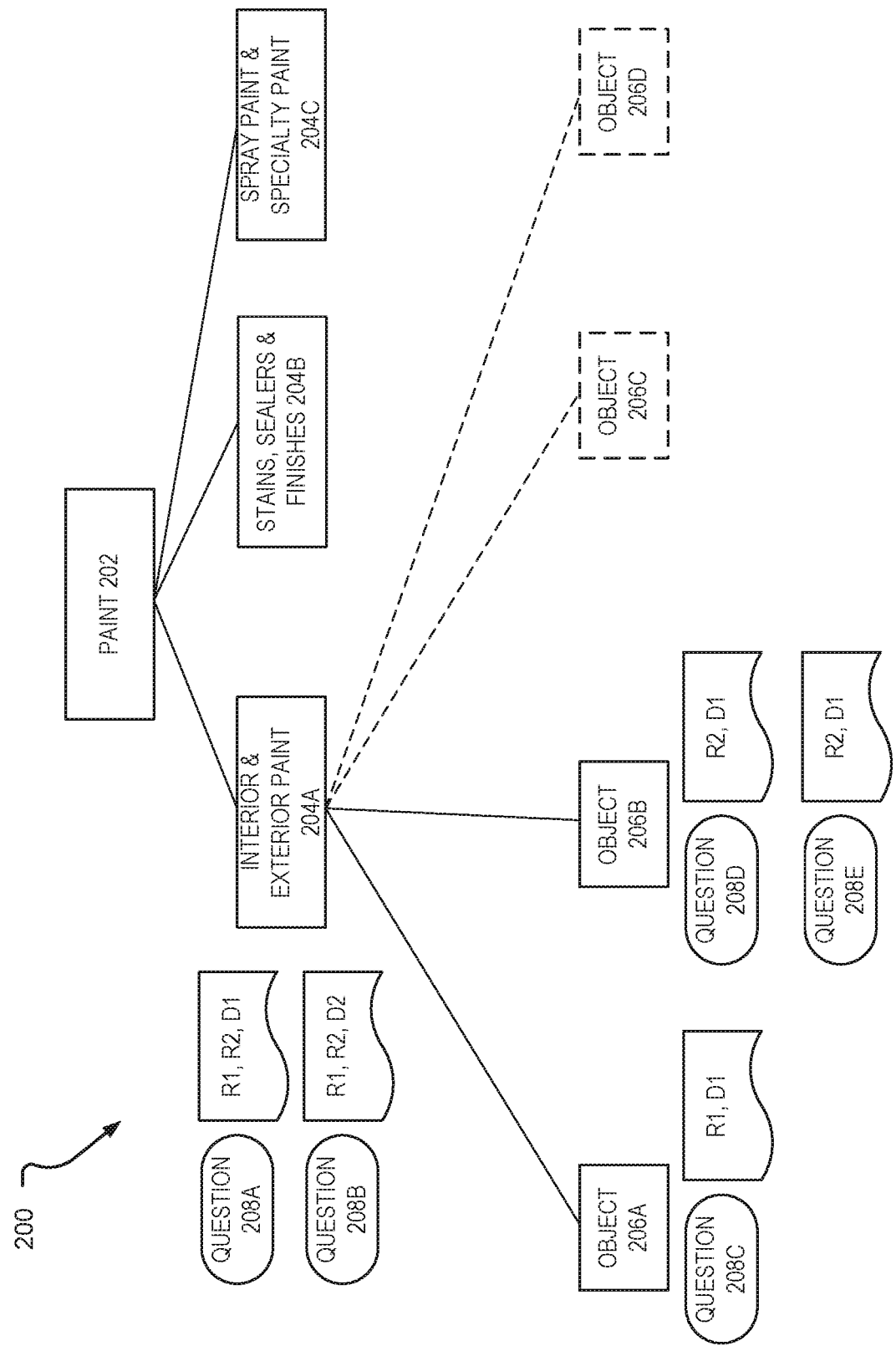
FIG. 2 is a block diagram illustrating a taxonomy of categories and objects applicable to a retail procurement process, along with associated questions, in accordance with an example embodiment.

In order to facilitate the use of the machine learned model, in an example embodiment, the questions 142 may be stored with one or more attributes to which the questions 142 will apply. These attributes may either be assigned by a human or be learned via a machine learning algorithm. FIG. 2 is a block diagram illustrating a taxonomy 200 of categories and objects applicable to a retail procurement process, along with associated questions, in accordance with an example embodiment.

Here, a portion of the taxonomy 200 involving the category of Paint 202 is depicted. As can be seen, there may be a number of sub-categories of Paint 202, including Interior & Exterior Paint 204A; Stains, Sealers & Finishes 204B; and Spray Paint & Specialty Paint 204C. While further sub-categories are not depicted, each of these sub-categories may have sub-categories of its own. For example, Interior & Exterior Paint may include Interior Paint, Exterior Paint, Primer, Ceiling Paint, Concrete Paint, and Masonry Paint. For ease of description, however, only two levels of categories are depicted in FIG. 2.

Also depicted in FIG. 2 are objects 206A and 206B. Since these are depicted as being children of the Interior & Exterior Paint 204A sub-category, these objects 206A, 206B may be assumed to be Interior or Exterior paints.

Also depicted in FIG. 2 are questions 208A, 208B, 208C, 208D, and 208E. The questions 208A and 208B apply generally to Interior & Exterior Paints. The question 208C applies more narrowly to the object 206A, and the questions 208D and 208E apply narrowly to the object 206B. Data structures for the questions 208A-208E may contain one or more attributes of objects to which the questions apply. Thus, for example, the question 208A applies to instances of objects in regions R1 and R2 and department D1, whereas the question 208B applies in regions R1 and R2 and department D2.

Notably, however, some questions may only apply to objects with attributes that are not listed in these data structures. For example, while the question 208A may apply to all objects in regions R1 and R2 and department D1, the question 208B may only apply to objects in regions R1 and R2 and department D2 that also contain ingredient i1. Thus, in the paint example, the question 208A may be "What is the drying time?" while the question 208B may be "How much of ingredient i1 does it have?"

At some point, the system 100 may attempt to add a new object to the taxonomy 200. This may be performed, for example, by the client application 102A. Objects 206C and 206D are depicted with dotted lines to indicate that they are being newly added. As such, it is desirable to have the system 100 automatically determine which of the existing pregenerated questions 208A-208E apply to the objects 206C and 206D. In this example, some of these pregenerated questions, specifically the questions 208A and 208B, can potentially be inherited from the sub-category to which these objects are assigned, albeit with the limitation that it would be desirable not to have these questions automatically inherited in that they have attributes in their respective data structures that may need to be matches in order for the question to apply, as well as potentially attributes such as ingredient that are not contained in their respective data structures. In addition to questions inherited from categories, it is possible that questions from sibling objects, such as the questions 208C-208E, may also apply to the objects 206C and 206D.

As such, in an example embodiment, a machine learned model is used to determine whether the questions 208C-208E apply to the objects 206C and 206D. This machine learned model may also be used to determine whether the questions 208A and 208B apply to the objects 206C and 206D.

Figure 3:
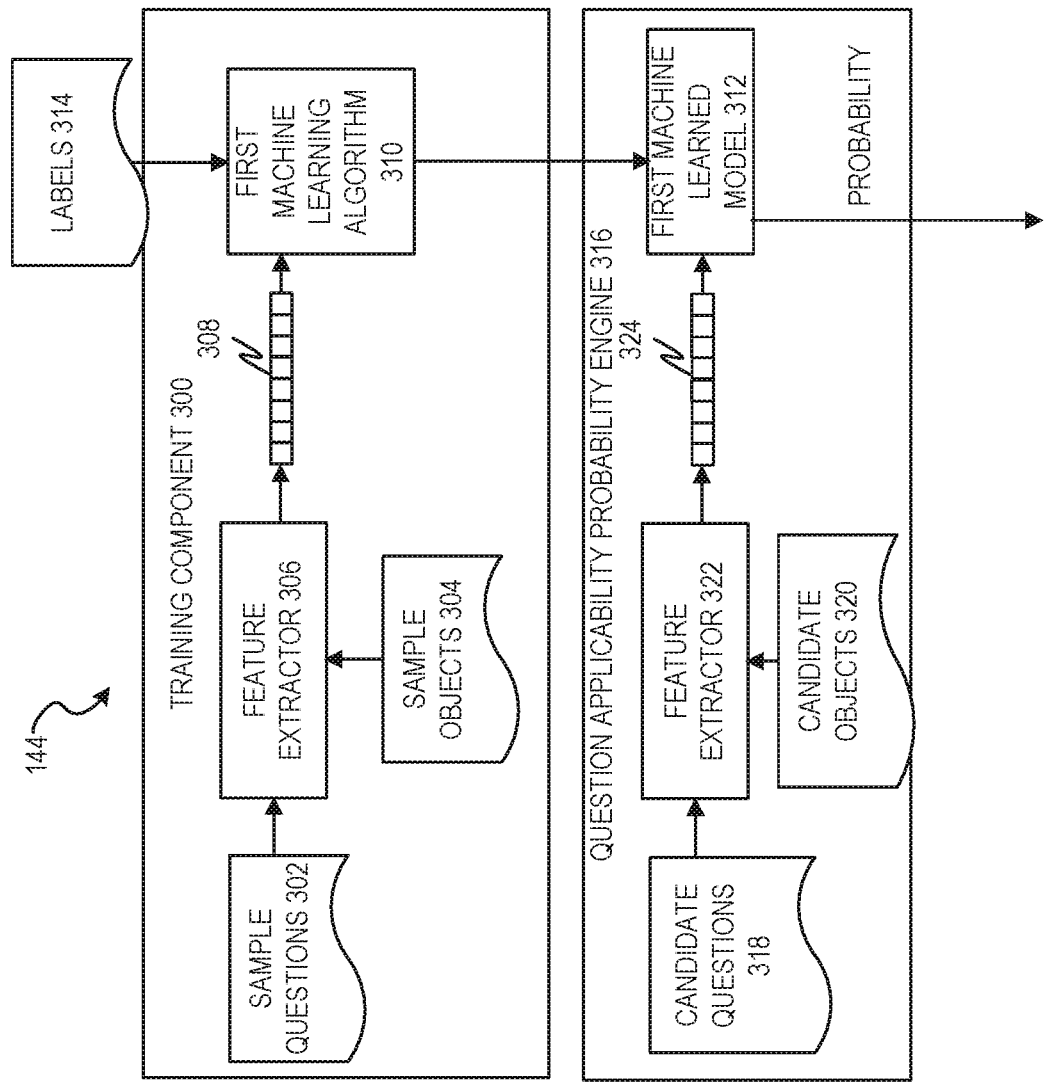
FIG. 3 is a block diagram illustrating a first machine learning component of FIG. 1 in more detail, in accordance with an example embodiment.

Referring back to FIG. 1, the machine learned model may be trained and operated using a first machine learning component 144. FIG. 3 is a block diagram illustrating the first machine learning component 144 of FIG. 1 in more detail, in accordance with an example embodiment. In a training component 300, sample questions 302 and sample objects 304 are fed to a feature extractor 306, which acts to extract curated features 308 from the sample questions 302 and sample objects 304. A feature is a variable pertaining to an input piece of data. Example object features include ingredients of the object, location of manufacture, object type, power requirements (if applicable), hierarchy of the object, category of the object, region of previous purchases of the object, department of previous purchases of the object, site of previous purchases of the object, organization that procured the object previously, or any other feature of the object. Additionally, information from third parties such as new compliance laws and regulations can also be considered to be features of the objects (to the extent that the laws and regulations apply to the objects). Example question features include the presence and frequency of particular terms, question length, and the like.

In an example embodiment, the curated features 308 are then used as input to a first machine learning algorithm 310 to train a first machine learned model 312 to generate a probability that a candidate question is applicable to a candidate object. In certain types of machine learning algorithms, the training may include providing labels 314 to the first machine learning algorithm 310. The labels identify whether particular sample questions 302 are applicable to particular sample objects 304. In some instances these labels may be binary in nature (e.g., the particular sample question is or is not applicable to the particular sample object), but in other instances these labels may be non-binary, such as ratings or numerals on a particular scale with one side of the scale indicating a higher applicability and the other side of the scale indicating a lower applicability.

The first machine learning algorithm 310 may be selected from among many different potential supervised or unsupervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

In a question applicability probability engine 316, candidate questions 318 and candidate objects 320 are fed to a feature extractor 322, which acts to extract curated features 324 from the candidate questions 318 and candidate objects 320. The curated features 324 are then used as input to the first machine learned model 312, which outputs, for each question/object combination, a score indicating the probability that the candidate question 318 is applicable to the corresponding candidate object 320.

It should be noted that in some example embodiments the curated features 324 are the same as the curated features 308.

Whenever a new object is added to master data in a directory, it is usually under an existing category. If a new category is added to the master data it will usually be added as a sub-category of an existing category. Based on this, the first machine learning component 144 may draw a pattern for new added objects and categories to figure out the similarity for them.

Figure 4:
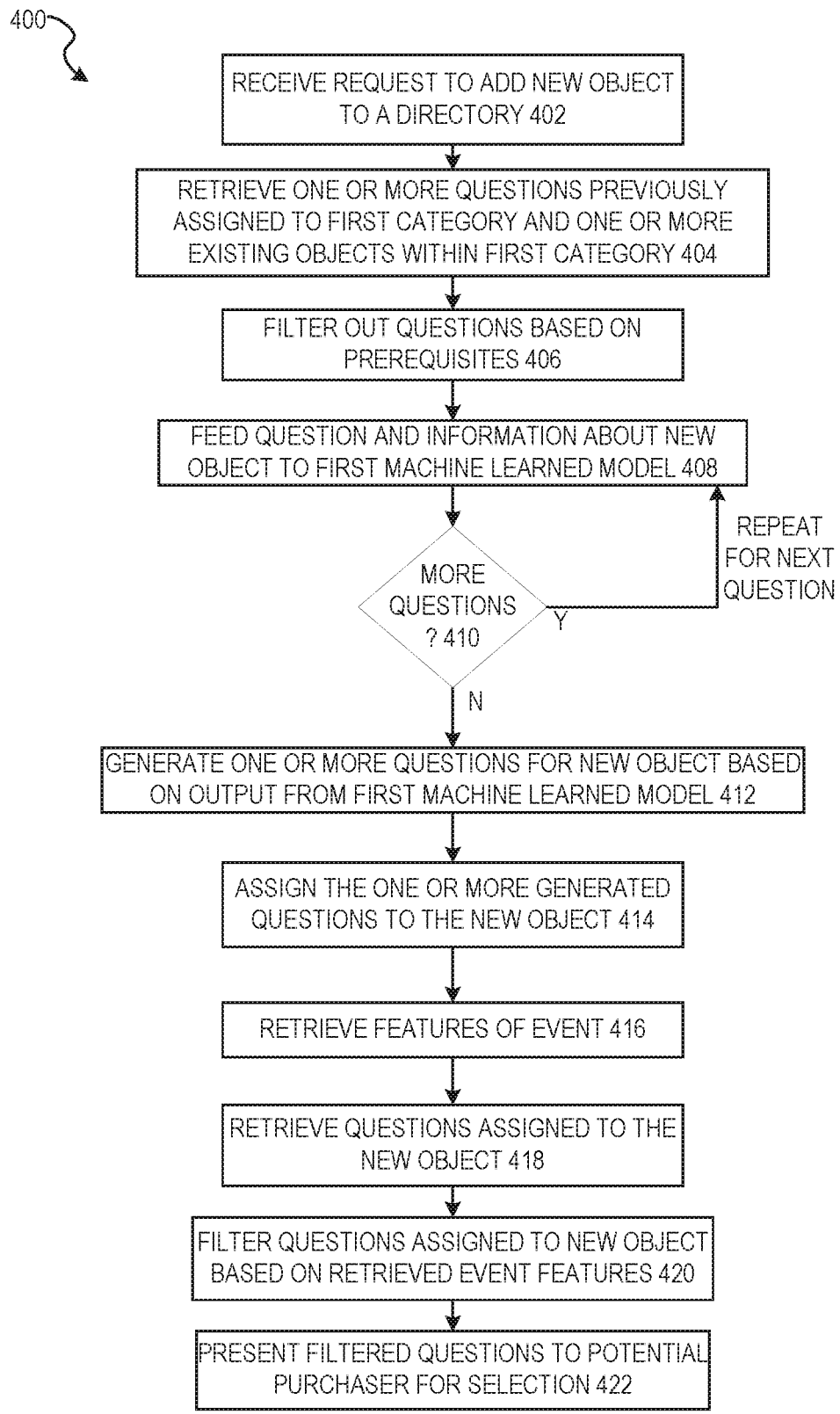
FIG. 4 is a flow diagram illustrating a method, in accordance with an example embodiment, for automatically generating a question for a new object in a directory.

FIG. 4 is a flow diagram illustrating a method 400, in accordance with an example embodiment, for automatically generating a question for a new object in a directory. At operation 402, a request to add a new object to a directory may be received. In some example embodiments, the request includes information about the new object, including a first category in a hierarchical taxonomy and other features of the new object. At operation 404, one or more questions previously assigned to the first category and/or to one or more existing objects within the first category are retrieved. These retrieved one or more questions constitute the base set of potential questions to generate for the new object.

The one or more questions each may include data and metadata. The data is the question itself, whereas the metadata is a data structure that may include one or more prerequisite object and/or event features for the question. An event in this context is a procurement of an instance of the object. Example event feature prerequisites may include event location and event department. Example object prerequisites may include ingredients. In an example embodiment, object prerequisites for objects may be learned via a second machine learning component 146. The second machine learning component 146 will be described in more detail below. The event feature prerequisites may be utilized later, when a purchaser is considering purchasing the new object, and the generated questions for the new object may be considered for proposal to the seller. The object prerequisites, however, may be utilized when the new object is being added to filter the potential questions.

At operation 406, attributes of the new object may be compared with the one or more prerequisite object features for each of the retrieved one or more questions, filtering out any questions whose prerequisites are not met. Thus, for example, if the question only pertains to objects containing a particular ingredient and the new object fails to contain that ingredient, the question may be filtered out from the list of potential questions for the new object.

A loop is then begun for each of the retrieved one or more questions. At operation 408, the question and the information about the new object are fed to a first machine learned model trained to output a likelihood that the question is applicable to the new object. This first machine learned model was trained using information about the one or more existing objects within the first category and the one or more questions previously assigned to the first category. The result of operation 408 is a probability that the question is applicable to the new object.

At operation 410, it is determined if there are any more questions in the retrieved one or more questions. If so, then the method 400 loops back up to operation 408 for the next question in the retrieved one or more questions. If not, then at operation 412 one or more questions are generated for the new object based on the results for each of the retrieved one or more questions from operation 406. This may take many different forms dependent on implementation. In one example embodiment, the probabilities, output by the machine learned model, for each of the retrieved one or more questions are compared to a predetermined threshold. Questions whose probability exceeds this predetermined threshold are selected for generation for the new object. In another example embodiment, the retrieved one or more questions are displayed in a graphical user interface to a user. An indication of the probabilities, output by the machine learned model, for each of the retrieved one or more questions is also presented in this graphical user interface. The user may then select one or more of these questions for generation for the new object. The indication may, for example, be a numerical probability (e.g., between 0 and 100%) displayed next to each question indicating the likelihood that the question applies to the new object. In another example, the indication may be less exact, such as a color (e.g., green indicating very high probability, yellow indicating medium probability, and red meaning low probability).

At operation 414, the one or more generated questions may be assigned to the new object. This may include, for example, saving the one or more generated questions in a data structure associated with the new object.

At a later time, a potential purchaser of an instance of the object may wish to consider posing questions of the seller of the new object. This may be considered an event. At operation 416, features of the event may be retrieved. These features may include aspects of the event itself or aspects related to how the underlying object may be utilized if the event results in a purchase. Examples of these event features may include the location and the department. At operation 418, the questions assigned to the new object may be retrieved (such as by retrieving the data structure associated with the new object). At operation 420, the questions assigned to the new object may be filtered based on the retrieved event features. This may include, for example, eliminating from consideration any questions whose data structure contains event feature prerequisites that are not met by the event features of the event. At operation 422, the filtered questions may be presented to a potential purchaser for selection.

Figure 5:
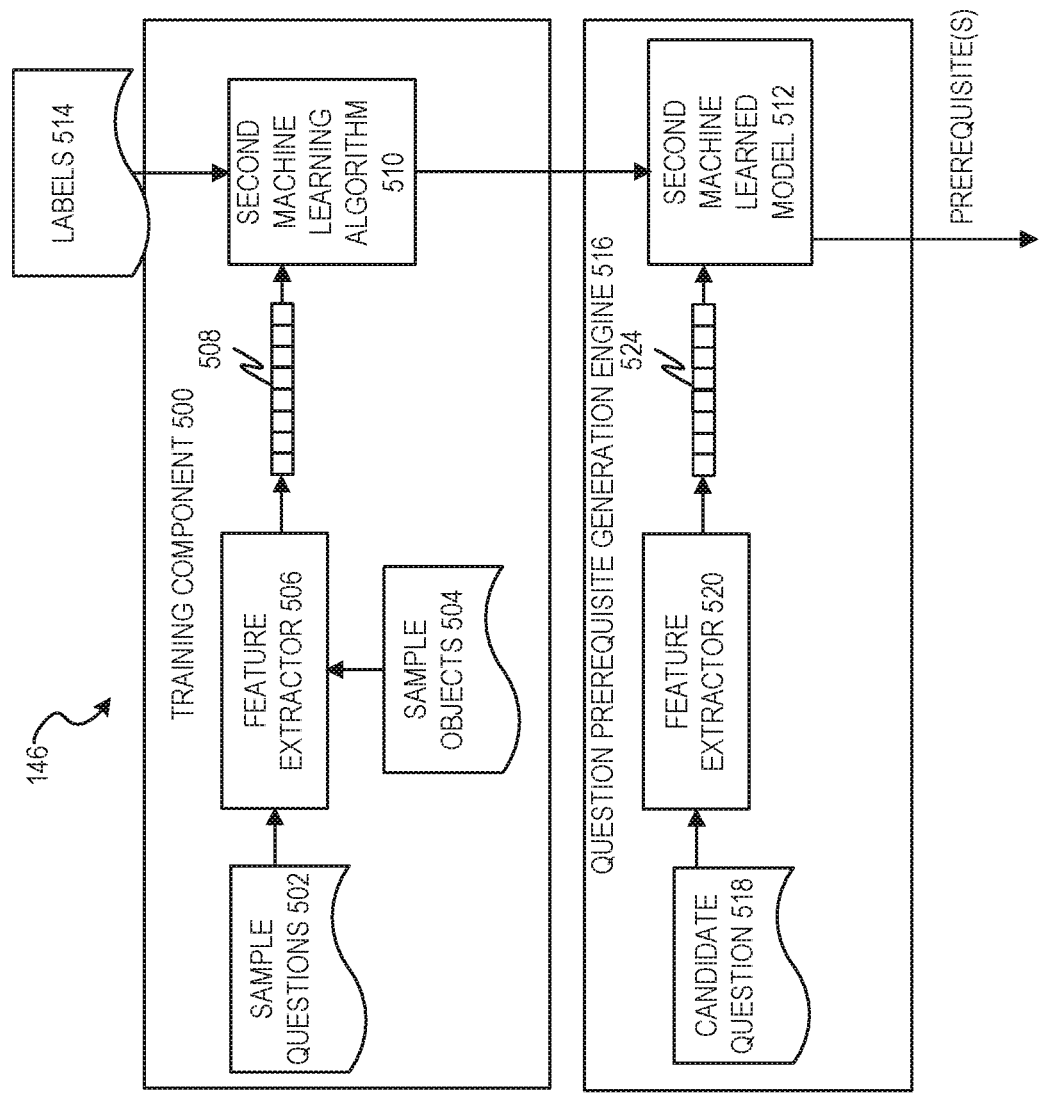
FIG. 5 is a block diagram illustrating a second machine learning component of FIG. 1 in more detail, in accordance with an example embodiment.

As described above, the second machine learning component 146 acts to learn object prerequisites for questions. FIG. 5 is a block diagram illustrating the second machine learning component 146 of FIG. 1 in more detail, in accordance with an example embodiment. In a training component 500, sample questions 502 and sample objects 504 are fed to a feature extractor 506, which acts to extract curated features 508 from the sample questions 502 and sample objects 504. Example object features include ingredients of the object, location of manufacture, object type, power requirements (if applicable), hierarchy of the object, category of the object, region of previous purchases of the object, department of previous purchases of the object, site of previous purchases of the object, organization that procured the object previously, or any other feature of the object. Additionally, information from third parties such as new compliance laws and regulations can also be considered to be features of the objects (to the extent that the laws and regulations apply to the objects). Example question features include the presence and frequency of particular terms, question length, and the like.

In an example embodiment, the curated features 508 are then used as input to a second machine learning algorithm 510 to train a second machine learned model 512 to generate a probability that a particular object feature is a prerequisite for a particular question. In certain types of machine learning algorithms, the training may include providing labels 514 to the second machine learning algorithm 510. The labels identify whether particular sample questions 502 are applicable to particular sample objects 504. In some instances these labels may be binary in nature (e.g., the particular sample question is or is not applicable to the particular sample object), but in other instances these labels may be non-binary, such as ratings or numerals on a particular scale with one side of the scale indicating a higher applicability and the other side of the scale indicating a lower applicability.

The second machine learning algorithm 510 may be selected from among many different potential supervised or unsupervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

In a question prerequisite generation engine 516, a candidate question 518 is fed to a feature extractor 520, which acts to extract curated features 524 from the candidate question 518. The curated features 524 are then used as input to the second machine learned model 512, which outputs one or more prerequisites for the input candidate question 518. These one or more prerequisites may then be stored in a data structure associated with the input candidate question 518.

It should be noted that in some example embodiments the curated features 524 are the same as the curated features 508.

It should also be noted that while the first machine learning component 144 and second machine learning component 146 are depicted and described as separate components, in some example embodiments these components may be merged.

FIG. 6 is a screen diagram illustrating a graphical user interface 600, in accordance with an example embodiment. This graphical user interface 600 may be presented to a user wishing to add a new object to a directory. Here, an area 602 of the graphical user interface 600 displays potential questions 604A-604H to be assigned to a new object (here, a large cheese pizza). Next to each potential question 604A-604H is a selection box 606A-606H. For each potential question 604A-604H the user wishes to assign to the new object, the user can select the corresponding selection box 606A-606H. Then, the user may select an add button 608 to assign the selected questions to the new object.

EXAMPLES

Example 1

A system comprising:
a memory; and
a computer-readable medium having instructions stored thereon, which, when executed by a processor, cause the system to perform operations comprising:
receiving a request, via a graphical user interface, to add a new object to a directory of objects, the new object having a first category in a hierarchical taxonomy of categories and objects;
retrieving one or more questions previously assigned to the first category and/or one or more existing objects within the first category;
feeding each of the retrieved one or more questions and information about the new object into a first machine learned model trained to output a probability that a question is applicable to an object;
generating one or more questions for the new object based on the probability for each of the retrieved one or more questions; and
assigning at least one of the one or more generated questions to the new object.

Example 2

The system of Example 1, wherein the first machine learned model is trained by:
feeding one or more sample questions and associated objects into a feature extractor designed to extract one or more features from the one or more sample questions and associated objects; and
passing the extracted one or more features and associated labels into a first machine learning algorithm to train the first machine learned model.

Example 3

The system of Examples 1 or 2, wherein the operations further comprise filtering out one or more of the retrieved one or more questions based on one or more prerequisites saved for each of the retrieved one or more questions.

Example 4

The system of Example 3, wherein at least one of the one or more prerequisites is an ingredient.

Example 5

The system of Example 4, wherein the ingredient is generated by passing the corresponding question into a second machine learned model trained to output one or more prerequisites.

Example 6

The system of any of Examples 1-5, wherein the operations further comprise:
receiving, from a second graphical user interface, information about an event involving the new object;

retrieving the at least one generated question assigned to the new object; and filtering the at least one generated question assigned to the new object based on the information about the event.

Example 7

The system of Example 6, wherein the information about the event includes a location.

Example 8

A method comprising:
receiving a request, via a graphical user interface, to add a new object to a directory of objects, the new object having a first category in a hierarchical taxonomy of categories and objects;
retrieving one or more questions previously assigned to the first category and/or one or more existing objects within the first category;
feeding each of the retrieved one or more questions and information about the new object into a first machine learned model trained to output a probability that a question is applicable to an object;
generating one or more questions for the new object based on the probability for each of the retrieved one or more questions; and
assigning at least one of the one or more generated questions to the new object.

Example 9

The method of Example 8, wherein the first machine learned model is trained by:
feeding one or more sample questions and associated objects into a feature extractor designed to extract one or more features from the one or more sample questions and associated objects; and
passing the extracted one or more features and associated labels into a first machine learning algorithm to train the first machine learned model.

Example 10

The method of Examples 8 or 9, further comprising filtering out one or more of the retrieved one or more questions based on one or more prerequisites saved for each of the retrieved one or more questions.

Example 11

The method of Example 10, wherein at least one of the one or more prerequisites is an ingredient.

Example 12

The method of Example 11, wherein the ingredient is generated by passing the corresponding question into a second machine learned model trained to output one or more prerequisites.

Example 13

The method of any of Examples 8-12, further comprising:
receiving, from a second graphical user interface, information about an event involving the new object;

retrieving the at least one generated question assigned to the new object; and filtering the at least one generated question assigned to the new object based on the information about the event.

Example 14

The method of Example 13, wherein the information about the event includes a location.

Example 15

A non-transitory machine-readable storage medium comprising instructions which, when implemented by one or more machines, cause the one or more machines to perform operations comprising:
receiving a request, via a graphical user interface, to add a new object to a directory of objects, the new object having a first category in a hierarchical taxonomy of categories and objects;
retrieving one or more questions previously assigned to the first category and/or one or more existing objects within the first category;
feeding each of the retrieved one or more questions and information about the new object into a first machine learned model trained to output a probability that a question is applicable to an object;
generating one or more questions for the new object based on the probability for each of the retrieved one or more questions; and
assigning at least one of the one or more generated questions to the new object.

Example 16

The non-transitory machine-readable storage medium of Example 15, wherein the first machine learned model is trained by:
feeding one or more sample questions and associated objects into a feature extractor designed to extract one or more features from the one or more sample questions and associated objects; and
passing the extracted one or more features and associated labels into a first machine learning algorithm to train the first machine learned model.

Example 17

The non-transitory machine-readable storage medium of Examples 15 or 16, wherein the operations further comprise filtering out one or more of the retrieved one or more questions based on one or more prerequisites saved for each of the retrieved one or more questions.

Example 18

The non-transitory machine-readable storage medium of Example 17, wherein at least one of the one or more prerequisites is an ingredient.

Example 19

The non-transitory machine-readable storage medium of Example 18, wherein the ingredient is generated by passing the corresponding question into a second machine learned model trained to output one or more prerequisites.

Example 20

The non-transitory machine-readable storage medium of any of Examples 15-19, wherein the operations further comprise:

receiving, from a second graphical user interface, information about an event involving the new object;

retrieving the at least one generated question assigned to the new object; and filtering the at least one generated question assigned to the new object based on the information about the event.

Figure 7:
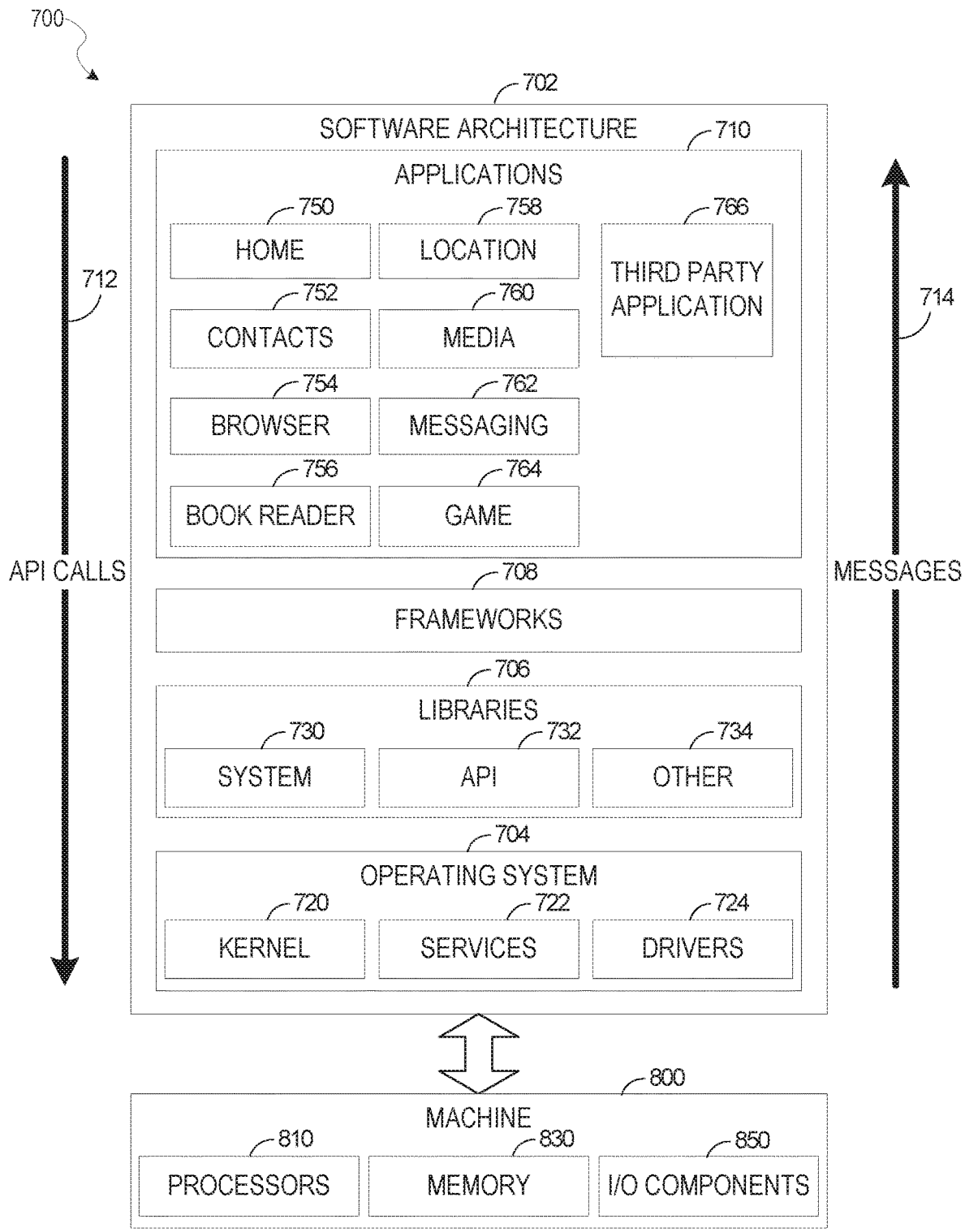
FIG. 7 is a block diagram illustrating an architecture of software, which can be installed on any one or more of the devices described above.

FIG. 7 is a block diagram 700 illustrating an architecture of software 702, which can be installed on any one or more of the devices described above. FIG. 7 is merely a non-limiting example of a software architecture, and it will be appreciated that many other architectures can be implemented to facilitate the functionality described herein. In various embodiments, the software 702 is implemented by hardware such as a machine 800 of FIG. 8 that includes processors 810, memory 830, and input/output (I/O) components 850. In this example architecture, the software 702 can be conceptualized as a stack of layers where each layer may provide a particular functionality. For example, the software 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec. Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
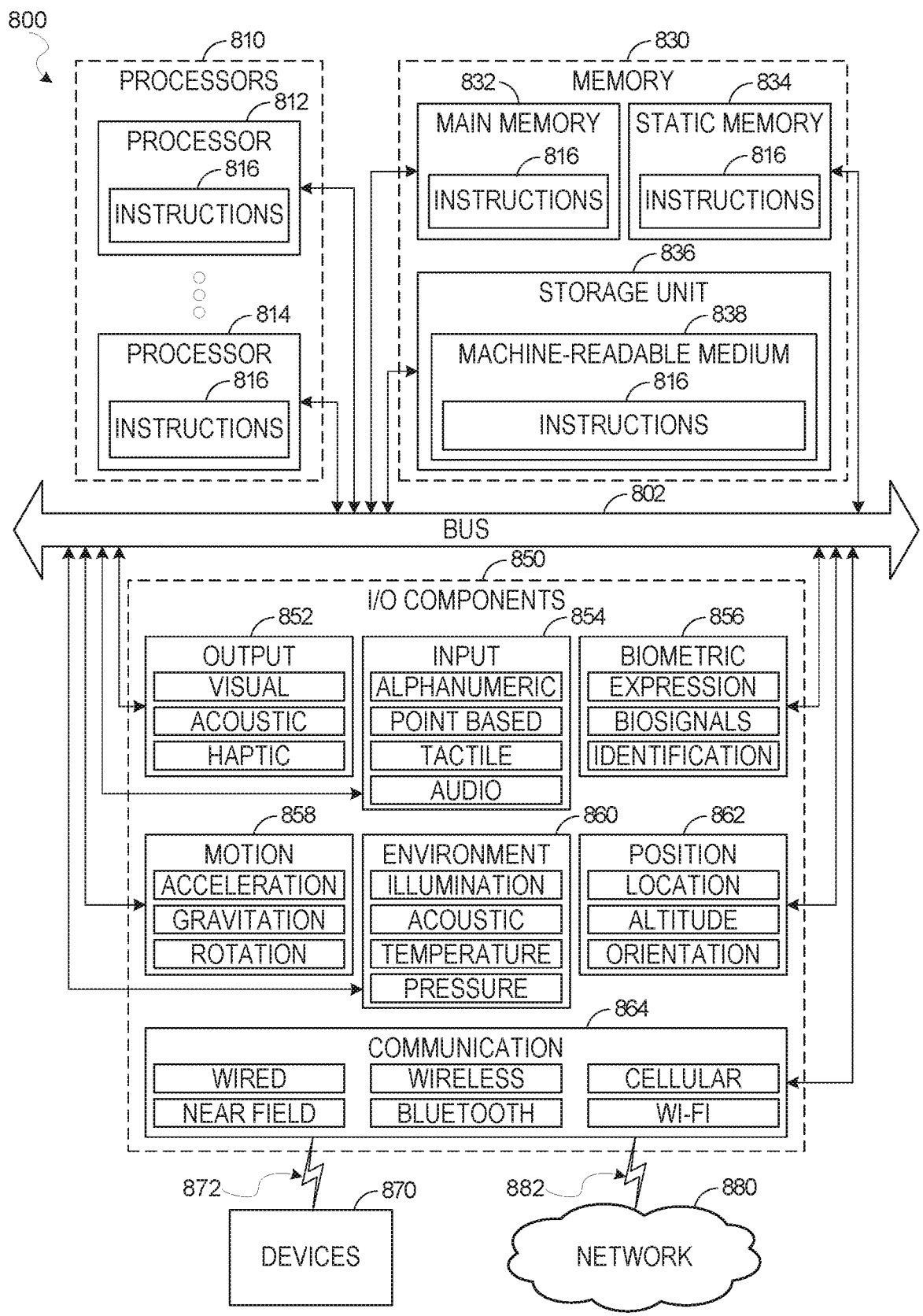
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 400 of FIG. 4. Additionally, or alternatively, the instructions 816 may implement FIGS. 1-6, and so forth. The instructions 816 may also be stored in a machine-readable medium 838 and transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Executable Instructions and Machine-Storage Medium

The various memories (i.e., 830, 832, 834, and/or memory of the processor(s) 810) and/or the storage unit 836 may store one or more sets of instructions and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   a memory; and
   a computer-readable medium having instructions stored thereon, which, when executed by a processor, cause the system to perform operations comprising:
   receiving a request, via a graphical user interface, to add a new object to a directory of objects, the new object having a first category in a hierarchical taxonomy of categories and objects;
   retrieving one or more questions previously assigned prior to the receiving the request, to the first category and/or one or more existing objects within the first category;
   feeding each of the retrieved one or more questions and information about the new object into a first machine learned model trained to output a probability that a question is applicable to an object, wherein the first machine learned model is trained by:
   feeding one or more sample questions and associated objects into a feature extractor designed to extract one or more features from the one or more sample questions and associated objects; and
   passing the extracted one or more features and associated labels into a first machine learning algorithm to train the first machine learned model;
   generating one or more questions for the new object based on the probability for each of the retrieved one or more questions;
   assigning at least one of the one or more generated questions to the new object; and
   causing presentation of one or more of the one or more generated questions to a user for selection.

2. The system of claim 1, wherein the operations further comprise filtering out one or more of the retrieved one or more questions based on one or more prerequisites saved for each of the retrieved one or more questions.

3. The system of claim 2, wherein at least one of the one or more prerequisites is an ingredient.

4. The system of claim 3, wherein the ingredient is generated by passing a corresponding question into a second machine learned model trained to output one or more prerequisites.

5. The system of claim 1, wherein the operations further comprise:
receiving, from a second graphical user interface, information about an event involving the new object;
retrieving the at least one generated question assigned to the new object; and
filtering the at least one generated question assigned to the new object based on the information about the event.

6. The system of claim 5, wherein the information about the event includes a location.

7. A method comprising:
receiving a request, via a graphical user interface, to add a new object to a directory of objects, the new object having a first category in a hierarchical taxonomy of categories and objects;
retrieving one or more questions previously assigned prior to the receiving the request, to the first category and/or one or more existing objects within the first category;
feeding each of the retrieved one or more questions and information about the new object into a first machine learned model trained to output a probability that a question is applicable to an object, wherein the first machine learned model is trained by:
feeding one or more sample questions and associated objects into a feature extractor designed to extract one or more features from the one or more sample questions and associated objects; and
passing the extracted one or more features and associated labels into a first machine learning algorithm to train the first machine learned model;
generating one or more questions for the new object based on the probability for each of the retrieved one or more questions;
assigning at least one of the one or more generated questions to the new object; and
causing presentation of one or more of the one or more generated questions to a user for selection.

8. The method of claim 7, further comprising filtering out one or more of the retrieved one or more questions based on one or more prerequisites saved for each of the retrieved one or more questions.

9. The method of claim 8, wherein at least one of the one or more prerequisites is an ingredient.

10. The method of claim 9, wherein the ingredient is generated by passing a corresponding question into a second machine learned model trained to output one or more prerequisites.

11. The method of claim 7, further comprising:
receiving, from a second graphical user interface, information about an event involving the new object;
retrieving the at least one generated question assigned to the new object; and
filtering the at least one generated question assigned to the new object based on the information about the event.

12. The method of claim 11, wherein the information about the event includes a location.

13. A non-transitory machine-readable storage medium comprising instructions which, when implemented by one or more machines, cause the one or more machines to perform operations comprising:
receiving a request, via a graphical user interface, to add a new object to a directory of objects, the new object having a first category in a hierarchical taxonomy of categories and objects;
retrieving one or more questions previously assigned prior to the receiving the request, to the first category and/or one or more existing objects within the first category;
feeding each of the retrieved one or more questions and information about the new object into a first machine learned model trained to output a probability that a question is applicable to an object, wherein the first machine learned model is trained by:
feeding one or more sample questions and associated objects into a feature extractor designed to extract one or more features from the one or more sample questions and associated objects; and
passing the extracted one or more features and associated labels into a first machine learning algorithm to train the first machine learned model;
generating one or more questions for the new object based on the probability for each of the retrieved one or more questions;
assigning at least one of the one or more generated questions to the new object; and
causing presentation of one or more of the one or more generated questions to a user for selection.

14. The non-transitory machine-readable storage medium of claim 13, wherein the operations further comprise filtering out one or more of the retrieved one or more questions based on one or more prerequisites saved for each of the retrieved one or more questions.

15. The non-transitory machine-readable storage medium of claim 14, wherein at least one of the one or more prerequisites is an ingredient.

16. The non-transitory machine-readable storage medium of claim 15, wherein the ingredient is generated by passing a corresponding question into a second machine learned model trained to output one or more prerequisites.

17. The non-transitory machine-readable storage medium of claim 13, wherein the operations further comprise:
receiving, from a second graphical user interface, information about an event involving the new object;
retrieving the at least one generated question assigned to the new object; and
filtering the at least one generated question assigned to the new object based on the information about the event.

* * * * *